UNITED STATES PATENT OFFICE 2,552,513

SEPARATION OF ALDEHYDES AND KETONES

Doris Wilson Blanchard, Jackson Heights, George G. Lauer, New York, and Robert S. Pratt, Valley Stream, N. Y., assignors to The M. W. Kellogg Company, Jersey City, N. J., a corporation of Delaware No Drawing. Application July 24, 1948, Serial No. 40,618

11 Claims. (Cl. 260—450)

This invention relates to the separation of aldehydes and ketones from mixtures thereof, and relates more particularly to a method for the separation of the components of mixtures containing aldehydes and ketones wherein these mixtures contain other non-acid oxygenated organic compounds and hydrocarbons as additional components. Still more particularly, the invention relates to a method for the separation of the components of mixtures containing aldehydes and ketones, wherein these mixtures contain other non-acid oxygenated organic compounds and hydrocarbons as additional components, and wherein these mixtures are obtained as products from the condensation of the reaction effluent produced in processes for the catalytic hydrogenation of oxides of carbon.

In processes for the catalytic hydrogenation of oxides of carbon at elevated temperatures there are obtained hydrocarbon-rich mixtures of non-acidic oxygenated organic compounds produced from the condensation of the resulting reaction effluent. These oxygenated compounds may comprise aldehydes, ketones, alcohols and esters. In effecting separation of the components of the aforementioned mixtures, it has been found highly desirable to effect the prior separation of carbonyls (that is, aldehydes and ketones) from the remaining hydrocarbons and non-acidic oxygenated compounds. It has been further found desirable to remove these carbonyls from the aforementioned mixtures in such manner that they may ultimately be recovered unchanged in the form of pure carbonyls.

Heretofore, it has been proposed to contact the aforementioned carbonyls, using various reactants to effect their separation from the remaining hydrocarbons and non-acidics in the form of a reaction product comprising these carbonyls, but in an altered condition. Such procedure, however, has been found to result not only in the obvious disadvantage of failing to recover these carbonyls in their original unaltered composition, but also in failing to effect a substantially complete separation from the remaining components of the mixtures treated. In addition, the individual separation of aldehyde and ketone components, utilizing the aforementioned methods, has not been attained, thus necessitating further costly treatment in effecting such separation.

It is, therefore, an object of the present invention to provide an improved method for separating aldehydes and ketones from mixtures thereof.

Another object of the invention is to provide an improved method for separating aldehydes and ketones from mixtures thereof, wherein such mixtures contain other non-acid oxygenated organic compounds and/or hydrocarbons as additional components.

Still another object of the invention is to provide an improved method for separating aldehydes and ketones from hydrocarbon-rich mixtures containing non-acid oxygenated organic compounds as additional components, wherein these mixtures are obtained as products in processes for the catalytic hydrogenation of oxides of carbon at elevated temperatures.

Other objects and advantages inherent in the invention will be apparent from the following more detailed disclosure.

We have found that it is possible, in accordance with the process of the invention, to selectively remove substantially all aldehydes from the aforementioned mixtures (and thus facilitate the subsequent separation of remaining ketones from other oxygenated organic compounds and/or hydrocarbons present) by effecting such separation through the use of substituted ammonias and their salts, as treating agents, to convert substantially all of the aldehydes and a minor portion of the ketones to their corresponding oximes; followed by proper adjustment of the pH value of the resulting reaction product; distilling the adjusted reaction product to separate unreacted ketones and non-aldehydic components from the aldehyde and ketone oximes, and finally acidifying these oximes to effect their conversion to their corresponding pure aldehydes and ketones.

Specifically, we first contact an aldehyde-ketone mixture, which contains one or more additional oxygenated organic compounds such as alcohols, esters and/or hydrocarbons (which may be obtained as products produced by the aforementioned catalytic hydrogenation of carbon oxides) with one or more substituted ammonias selected from the group consisting of hydroxylamine, hydrazine and their salts, in an amount sufficient to convert substantially all of the aldehydes to their corresponding oximes. By "a substituted ammonia" is meant a derivative of ammonia in which an amino or hydroxyl group is substituted for one of the hydrogen atoms. The substituted ammonia treating agent is added in slight excess over the theoretical quantity necessary to convert substantially all of the aldehydes to their corresponding oximes. Only such excess of the treating agent is required as will effectively remove substantially all of the aldehydes with only small amounts of ketoximes being formed. However, the treating agent may be added in excess of up to 10% over the theoretical quantity necessary to effect the aforementioned conversion of the aldehydes to their oximes. Inasmuch as the aldehydes react faster than the ketones, substantially all of the aldehydes will be converted to their oximes, while that portion of the treating agent present in excess will also effect conversion of a relatively small portion of the ketones to their corresponding oximes. The aforementioned conversion may be carried out in any suitable mixing zone and in any conventional manner which will insure complete reaction. It is preferable that the temperature in this mixing zone be maintained at approximately 50° C. in order to hasten the reaction; however, temperature conditions within this zone are not critical and the reaction may also be carried out at atmospheric pressure, below the boiling point of the mixture.

The resulting reaction product (comprising a mixture of aldoximes, relatively minor amounts of ketoximes, and the remainder of the ketones and unaltered non-aldehydic components present in the initial feed) is next neutralized, for example, either with a mineral acid such as sulfuric acid or hydrochloric acid, or an alkali such as sodium hydroxide, calcium hydroxide, or potassium hydroxide to a pH value within the range from about 4.5 and about 6.5. Inasmuch as the oximes are less volatile than the other components of the aforementioned resulting reaction product, this product may be next subjected to distillation to take off the relatively major quantities of unreacted ketones and other non-aldehydic components as a relatively low boiling overhead fraction; while the remainder of the reaction product, comprising the aforementioned aldoximes and relatively minor amounts of ketoximes, is withdrawn as a relatively high boiling fraction. The aforementioned relatively low boiling fraction can be subjected to any known process such as distillation or chromatographic absorption to effect separation of pure ketones from the remainder of the components comprising this fraction. The aforementioned relatively high boiling fraction, comprising aldehyde and ketone oximes (the latter being present in relatively minor amounts) is next acidified with a mineral acid such as sulfuric acid or hydrochloric acid, to a pH value below approximately 4.0 and preferably at 2.3 or less at which the hydrolysis rate is greatest, in order to convert these oximes to their corresponding pure aldehydes and ketones; and the aldehydes and ketones thus obtained may be separated from the resulting reaction product by distillation.

We have indicated that the aforementioned treating agent comprises a substituted ammonia selected from the group consisting of hydroxylamine, hydrazine and their salts. As specific treating agents, although not limited thereto, we may preferably employ hydroxylamine or hydrazine hydrochloride, hydroxylamine or hydrazine sulfate, hydroxylamine or hydrazine bromide; in addition we may employ such hydrazine derivatives as dinitrophenyl hydrazine, or phenyl hydrazine. In general, the aforementioned treating agents are prepared as aqueous solutions, in which the water content is sufficiently high as to permit the total quantity of the treating agent employed to be completely brought into solution. It will also be noted that in effecting the aforementioned neutralizations to the desired pH values, we have indicated that such mineral acids as sulfuric acid or hydrochloric acid may be employed for this purpose. However, it is preferable that the type of acidification agent employed possess a corresponding negative radical with that of the treating agent employed. Thus, when employing a treating agent such as hydroxylamine sulfate, acidification may be obtained using sulfuric acid; or when employing a treating agent such as hydroxylamine hydrochloride, hydrochloric acid may be employed as the acidification agent.

In effecting separation of aldehyde and ketone components from the aforementioned mixtures, it should be understood that the process of the invention is not limited to effecting the aforementioned separation of pure aldehydes and ketones alone, but their derivatives as well may be separated. For example, we may separate by the above method the following aldehyde-ketone derivatives: hydroxyl aldehydes and ketones, such as glycollic aldehyde, lactic aldehyde, acetaldol, acetoin, diacetone alcohol and polyhydroxy aldehydes and ketones, that is, those having more than one hydroxyl group in the molecule; dicarbonyl compounds (dialdehydes and diketones) such as glyoxal, malonic aldehyde, diacetyl, and acetylacetone; carboxylic aldehydes and ketones, such as glyoxylic acid, butanal acid, pyruvic acid and mesitonic acid; esters of hydroxy or carboxylic aldehydes and ketones. While only some of the more simple compounds in each of the aforementioned groups have been given, it should be understood that the process of the invention is applicable to any aldehyde or ketone capable of forming a stable reaction product with hydroxylamine, hydrazine and/or their salts.

The following examples are introduced for the purpose of further illustrating the novelty and utility of the present invention but not with the intention of unduly limiting the same.

Example I

A mixture having a composition by weight of propionaldehyde 1%, methyl ethyl ketone 3% and ethanol (95% concentration) 96%, as obtained from the catalytic hydrogenation of carbon monoxide, was treated with a 10% excess of hydroxylamine sulfate. This mixture was next neutralized to a pH of 6.0–6.5 and the ketone-alcohol mixture distilled from the resulting higher boiling oximes. The following analytical data in molecular equivalents per gram were obtained upon the distillate after following this procedure.

| Composition | Original Blend, m. eq./gm. | 1st Run, m. eq./gm. | 2nd Run, m. eq./gm. |
|---|---|---|---|
| Total carbonyls | 0.65 | 0.41 | 0.34 |
| Propionaldehyde | 0.17 | None | None |
| Methyl ethyl ketone (by differentiation) | 0.48 | 0.41 | 0.34 |

Example II

The procedure of Example I was repeated employing an initial mixture having a composition by weight of propionaldehyde 4.5%, methyl ethyl ketone 1.5% and ethanol (95% concentration) 94%. However, only 74% of the theoretical quantity of hydroxylamine sulfate required to react with the propionaldehyde present was employed. The following analytical data in molecular equivalents per gram were obtained upon the distillate after following this procedure.

| Composition | Original Blend, m. eq./gm. | 1st Run, m. eq./gm. | 2nd Run, m. eq./gm. |
|---|---|---|---|
| Total carbonyls | 0.87 | 0.35 | 0.29 |
| Propionaldehyde | 0.563 | 0.109 | 0.04 |
| Methyl ethyl ketone (by differentiation) | 0.307 | 0.241 | 0.25 |

Example III

The procedure of Example I was repeated employing an initial mixture having a composition by weight of propionaldehyde 3%, acetone 1% and ethanol (95% concentration) 96%. The following analytical data in molecular equivalents per gram were obtained upon the distillate after following this procedure.

| Composition | Original Blend, m. eq./gm. | 1st Run, m. eq./gm. | 2nd Run, m. eq./gm. |
|---|---|---|---|
| Total carbonyls | 0.78 | 0.25 | 0.24 |
| Propionaldehyde | 0.63 | None | 0.124 |
| Acetone (by differentiation) | 0.15 | 0.15 | 0.12 |

Example IV

The procedure of Example I was repeated employing an initial mixture having a composition by weight of propionaldehyde 1%, acetone 3% and ethanol (95% concentration) 96%. The following analytical data in molecular equivalents per gram were obtained upon the distillate after following this procedure.

| Composition | Original Blend, m. eq./gm. | m. eq./gm. |
|---|---|---|
| Total carbonyls | 0.90 | 0.6 |
| Propionaldehyde | 0.293 | 0.078 |
| Acetone (by differentiation) | 0.607 | 0.052 |

A compilation of the results obtained from the data from the foregoing examples, discloses the following aldehyde-ketone recovery as their corresponding oximes.

| Example | Run | Aldehydes, per cent | Ketones, per cent |
|---|---|---|---|
| I | 1 | 100 | 14.6 |
|   | 2 | 100 | 19.2 |
| II | 1 | 80.7 | 21.5 |
|    | 2 | 29.0 | 18.6 |
| III | 1 | 100 | 0.0 |
|     | 2 | 81.4 | 20 |
| IV | 1 | 73.4 | 14.4 |

We claim:

1. A method for separating an aldehyde and a ketone from a mixture thereof which comprises contacting said mixture with a compound comprising hydroxylamine in an amount restricted to less than that sufficient to convert all of said aldehyde and a substantial portion of said ketone to their corresponding oximes, and separating the oxime reaction product from said mixture.

2. A method for separating an aldehyde and a ketone from a mixture thereof wherein said mixture contains other non-acid oxygenated organic compounds and hydrocarbons as additional components which comprises contacting said mixture with a compound comprising hydroxylamine in an amount restricted to less than that sufficient to convert all of said aldehyde and a substantial portion of said ketone to their corresponding oximes, and separating the oxime reaction product from said mixture.

3. A method for separating an aldehyde and a ketone from a mixture thereof wherein said mixture contains alcohols, esters and hydrocarbons as additional components which comprises contacting said mixture with a compound comprising hydroxylamine in an amount restricted to less than that sufficient to convert all of said aldehyde and a substantial portion of said ketone to their corresponding oximes, and separating the oxime reaction product from said mixture.

4. A method for separating an aldehyde and a ketone from a mixture thereof which comprises contacting said mixture with a compound comprising hydroxylamine in an amount restricted to less than that sufficient to convert all of said aldehyde and a substantial portion of said ketone to their corresponding oximes, adjusting the resulting reaction product to a pH value within the range from about 4.5 and about 6.5, distilling said adjusted reaction product to obtain a relatively low boiling fraction comprising the unreacted portion of said ketone and a relatively high boiling fraction comprising the aforementioned oxime reaction product, acidifying said relatively high boiling fraction to a pH value below 4.0 to convert said oximes contained therein to their corresponding aldehyde and ketone, and distilling said aldehyde and ketone from the resulting reaction product.

5. A method for separating an aldehyde and a ketone from a mixture thereof wherein said mixture contains other non-acid oxygenated organic compounds and hydrocarbons as additional components which comprises contacting said mixture with a compound comprising hydroxylamine in an amount restricted to less than that sufficient to convert all of said aldehyde and a substantial portion of said ketone to their corresponding oximes, adjusting the resulting reaction product to a pH value within the range from about 4.5 and about 6.5, distilling said adjusted reaction product to obtain a relatively low boiling fraction comprising the unreacted portion of said ketone and nonaldehydic components and a relatively high boiling fraction comprising the aforementioned oxime reaction product, separating the unreacted portion of said ketone from said non-aldehydic components, acidifying said relatively high boiling fraction to a pH value below 4.0 to convert said oximes contained therein to their corresponding aldehyde and ketone, and distilling said aldehyde and ketone from the resulting reaction product.

6. A method for separating an aldehyde and a ketone from a mixture thereof wherein said mixture contains alcohols, esters and hydrocarbons as additional components which comprises contacting said mixture with a compound comprising hydroxylamine in an amount restricted to less than that sufficient to convert all of said aldehyde and a substantial portion of said ketone to their corresponding oximes, adjusting the resulting reaction product to a pH value within the range from about 4.5 and about 6.5, distilling said adjusted reaction product to obtain a relatively low boiling fraction comprising the unreacted portion of said ketone and non-aldehydic components and a relatively high boiling fraction comprising the aforementioned oxime reaction product, separating the unreacted portion of said ketone from said nonaldehydic components, acidifying said relatively high boiling fraction to a pH value below 4.0 to convert said oximes contained therein to their corresponding aldehyde and ketone, and distilling said aldehyde and ketone from the resulting reaction product.

7. In a process for the catalytic hydrogenation of an oxide of carbon in which is obtained a mixture comprising aldehydes, ketones, and other non-acid oxygenated organic compounds, the method for separating the components of said mixture which comprises contacting said mixture with a compound comprising hydroxylamine in an amount restricted to less than that sufficient to convert all of said aldehydes and a substantial portion of said ketones to their corresponding oximes, adjusting the resulting reaction product to a pH value within the range from about 4.5 and about 6.5, distilling said adjusted reaction product to obtain a relatively low boiling fraction comprising the unreacted portion of said ketone and non-aldehydic components and a relatively high boiling fraction comprising the aforementioned oxime reaction product, separating the unreacted portion of said ketones from said non-aldehydic components, acidifying said relatively high boiling fraction to a pH value below 4.0 to convert said oximes contained therein to their corresponding aldehydes and ketones, and distilling said aldehydes and ketones from the resulting reaction product.

8. A process as defined by claim 7 wherein said compound is hydroxylamine sulfate.

9. A process as defined by claim 7 wherein said compound is hydroxylamine hydrochloride.

10. A process as defined by claim 7 wherein said compound is hydroxylamine bromide.

11. A process as defined by claim 7 wherein said compound is hydroxylamine.

DORIS WILSON BLANCHARD.
GEORGE G. LAUER.
ROBERT S. PRATT.

REFERENCES CITED

The following references are of record in the file of this patent:

UNITED STATES PATENTS

| Number | Name | Date |
|---|---|---|
| 1,892,972 | Urbain | Jan. 3, 1933 |
| 1,987,601 | Burke | Jan. 15, 1935 |

OTHER REFERENCES

Sidgwick: "Organic Chemistry of Nitrogen," 2nd ed. (1942) (page 41), Oxford University Press.